United States Patent [19]

Taylor

[11] 4,394,117
[45] Jul. 19, 1983

[54] HOT SPRUE SLEEVE VALVE ASSEMBLY FOR AN INJECTION MOLDING MACHINE

[75] Inventor: Arnold E. Taylor, Lomita, Calif.

[73] Assignee: Discovision Associates, Costa Mesa, Calif.

[21] Appl. No.: 272,431

[22] Filed: Jun. 10, 1981

[51] Int. Cl.³ .............................................. B29F 1/03
[52] U.S. Cl. .................................... 425/549; 425/563; 425/564; 425/573
[58] Field of Search ............... 425/548, 549, 563, 564, 425/566, 573, 810

[56] References Cited

U.S. PATENT DOCUMENTS

| | | | |
|---|---|---|---|
| 4,125,352 | 11/1978 | Gellert | 425/549 X |
| 4,260,359 | 4/1981 | Dannels | 425/564 X |
| 4,289,468 | 9/1981 | von Holdt | 425/566 X |

FOREIGN PATENT DOCUMENTS

46-18627  5/1971  Japan .................................. 425/564

*Primary Examiner*—Thomas P. Pavelko

[57] ABSTRACT

A hot sprue valve assembly is provided for controlling flow of molten material into the mold cavity of an injection molding machine. The valve assembly is particularly designed for use with an injection molding machine for molding centrally apertured record discs, such as video information discs. The valve assembly includes a hot sprue bushing defining a heated flow path for passage of molten material toward a stationary dispersion head positioned centrally within the mold cavity. The dispersion head directs the molten material to flow in a generally radially outward direction with substantially uniform radial distribution into the mold cavity. A cylindrical sleeve valve is carried about the hot sprue bushing for reciprocal movement between an open position retracted from the mold cavity to permit flow of the molten material into the mold cavity, and a closed position projecting into the mold cavity in seated engagement with the dispersion head simultaneously to prevent flow of the molten material into the mold cavity and to mold a central aperture in the disc.

31 Claims, 15 Drawing Figures

HOT SPRUE SLEEVE VALVE ASSEMBLY FOR AN INJECTION MOLDING MACHINE

BACKGROUND OF THE INVENTION

This invention relates generally to injection molding machines, and more particularly, to injection molding machines including means for controlling flow of molten material into a mold cavity of a machine molding assembly designed for molding a centrally apertured record disc, such as a video information disc, and for molding a central aperture into such disc.

An example of an injection molding machine of this general type is disclosed in copending and commonly assigned patent applications U.S. Ser. No. 847,367, now abandoned filed in the name of J. R. Holmes et al., and entitled "METHOD AND MEANS FOR REPLICATING CENTRALLY APERTURED VIDEO DISC RECORDS", and U.S. Ser. No. 031,205, now abandoned filed in the name of J. R. Holmes, and entitled "MOLDING APPARATUS FOR PRODUCING CENTRALLY APERTURED RECORD DISCS". The machines described in these applications comprise injection molding machines having a molding assembly with first and second mold halves reciprocally movable between a closed position defining an annular mold cavity into which molten disc-forming material of plastic or the like is injected to form a video information disc, and an open position wherein the mold cavity parting line is opened and the resultant molded video information disc is removed from the machine. The mold cavity is lined by one or more disc-shaped stamping dies carried by the mold halves and these stamping dies include discontinuous surface configurations representive of the information to be formed on the disc.

In injection molding machines of this general type, it is well known to inject molten plastic material under pressure from an injector gun through a sprue bushing and into the mold cavity. When the mold cavity is filled with the molten plastic material, the respective mold halves and the sprue bushing are cooled by a circulating liquid coolant to reduce the temperature of the molten plastic material and thereby solidify the material. After solidification, the molded information disc is removed from the machine and the cycle restarted, thereby allowing a relatively rapid production rate of the information discs. However, the plastic material within the sprue bushing typically has a relatively large thickness compared with the plastic material within the mold cavity, whereby the plastic material within the sprue bushing takes the longest time to solidify. The cycle time for molding the information discs in machines of this type therefore tends to be dependent upon the longer cooling time of the material within the sprue bushing, and not upon the shorter cooling time of the material within the mold cavity. Moreover, this material within the sprue bushing when solidified comprises wasted plastic material which must be removed from the molded information disc as by means of a punch assembly or the like, to yield the desired thin, substantially planar information disc including the required central aperture.

Formation of the central aperture by means of a conventional punch assembly as disclosed generally in the above-referenced copending patent applications poses a variety of problems in the production of the information discs. For example, the punch step requires a certain cycle time to perform, thereby prolonging the cycle time for each information disc. Moreover, the use of the punch assembly to form the central aperture results in an aperture shape having a concentricity dependent upon the state of wear of the punch die. As punch die wear progresses, the likelihood of the creation of debris in the vicinity of the aperture increases, and such debris can deleteriously affect the quality of subsequently molded information discs. Finally, the use of a punch assembly places the information disc under substantial stress which occasionally can result in cracking of the disc in the region of the aperture, whereupon the disc must be rejected as scrap.

Some attempts have been proposed to mold an aperture in the information disc prior to solidification of the disc-forming material and thereby avoid use of a punch assembly. See, for example, copending and commonly assigned U.S. application Ser. No. 202,824, filed in the name of A. Cane et al., and entitled "HOT SPRUE VALVE ASSEMBLY FOR AN INJECTION MOLDING MACHINE" which discloses a valve assembly positioned across the mold cavity from the sprue bushing and operable to mold the central aperture while controlling flow of molten material into the mold cavity. However, this type of aperture-molding valve assembly requires relatively complex valve actuation devices and requires solidification of at least a portion of the disc-forming material within the region of the aperture and within the sprue bushing before the parting line can be opened and the molded disc removed. Accordingly, minimum disc cycle time is still not achieved and solidified material discarded as scrap is not avoided.

Other attempts have been made to mold an aperture in the information disc without requiring solidification and waste of any portion of the disc-forming material in the vicinity of the formed aperture or within the sprue bushing. See, for example, copending and commonly assigned U.S. Pat. No. 4,340,353 filed in the name of B. F. P. Mayer et al., and entitled "HOT SPRUE VALVE ASSEMBLY FOR AN INJECTION MOLDING MACHINE" which discloses a poppet valve structure movable in response to relatively complex valve actuation devices positioned across the mold cavity from the sprue bushing. However, this movable poppet valve structure has been found to cool relatively quickly during the cooling and solidification of the molten material within the mold cavity, resulting in undesired solidification of portions of the material within the sprue bushing. When this occurs, the solidified portions tend to clog the sprue bushing and prevent proper injection of molten material in the formation of subsequent information discs.

The present invention overcomes the problems and disadvantages of the prior art by providing an injection molding machine including an improved hot sprue valve assembly having simplified valve structure for controlling flow of molten material into the mold cavity and for molding a central aperture into an information disc prior to solidification of the material within a mold cavity. Moreover, the improved hot sprue valve assembly is designed to isolate the molten material within the sprue bushing from the material within the mold cavity to prevent solidification of material within the sprue bushing.

SUMMARY OF THE INVENTION

The present invention is embodied in an improved injection molding machine for use in producing centrally apertured record discs, such as video information discs. The machine includes a molding assembly having first and second mold halves reciprocally movable with respect to each other between a closed position defining an annular mold cavity into which molten disc-forming material, such as a molten plastic material, is injected to form the disc, and an open position wherein the mold parting line is opened and the molded disc can be extracted from the machine. At least one surface of the annular mold cavity is defined by a planar, disc-shaped stamping die carried by one of the two mold halves for use in imparting appropriate information to the surface of the molded disc.

According to the invention, the molding assembly for the machine includes an improved hot sprue valve assembly having a hot sprue bushing defining a flow path for passage of the molten disc-forming material at an elevated temperature into the mold cavity. This hot sprue bushing flow path is oriented generally at a right angle with respect to the plane of the mold cavity and is aligned axially with the central axis of the mold cavity. The molten disc-forming material is thus injected through the hot sprue bushing toward the mold cavity along an axis generally coincident with a central aperture to be molded into the information disc.

A stationary dispersion head is secured to the end of the hot sprue bushing and is positioned generally within the boundary of the central aperture to be formed in the molded information disc. This dispersion head includes a plurality of relatively small extrusion flow paths for dividing of the molten material into a plurality of smaller flow streams. These smaller flow streams are directed in a generally radially outward direction with substantially uniform radial distribution for flow into the mold cavity. In some embodiments of the invention, the dispersion head incorporates heater means for maintaining the temperature of the molten material in the vicinity of the head at a relatively high level to prevent solidification thereof.

A hollow cylindrical sleeve valve is carried concentrically about the hot sprue bushing for axial sliding movement toward and away from the mold cavity. More specifically, the sleeve valve is movable to an open position retracted from the mold cavity to permit the molten material to flow past the dispersion head and into the mold cavity. The sleeve valve is further movable to a closed position advanced at least partially into the mold cavity and into seated engagement with the periphery of the dispersion head to prevent flow of the molten material into the mold cavity. Importantly, in the closed position, the sleeve valve and the dispersion head cooperate to mold the central aperture of the desired dimension into the disc prior to solidification of the disc-forming material and without waste of any portion of the disc-forming material. If desired, the leading edge of the sleeve valve can include an appropriate bevel to mold a corresponding bevel into the central aperture of the disc, thereby facilitating placement of a molded disc onto the spindle of the information playback apparatus.

In one preferred arrangement of the invention, the sleeve valve is biased by a spring, such as a Belleville spring, toward the closed position to prevent flow of the molten material into the mold cavity. The sleeve valve is formed to include an angularly set pressure face contoured to respond to the pressure of molten material within the sprue bushing. When the pressure of molten material within the sprue bushing exceeds a predetermined magnitude, the sleeve valve retracts to the open position automatically in response to the pressure to permit flow of the molten material into the mold cavity until the mold cavity is filled and the injection pressure is relieved, whereupon the sleeve valve returns to the closed position.

Other features and advantages of the present invention will become apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
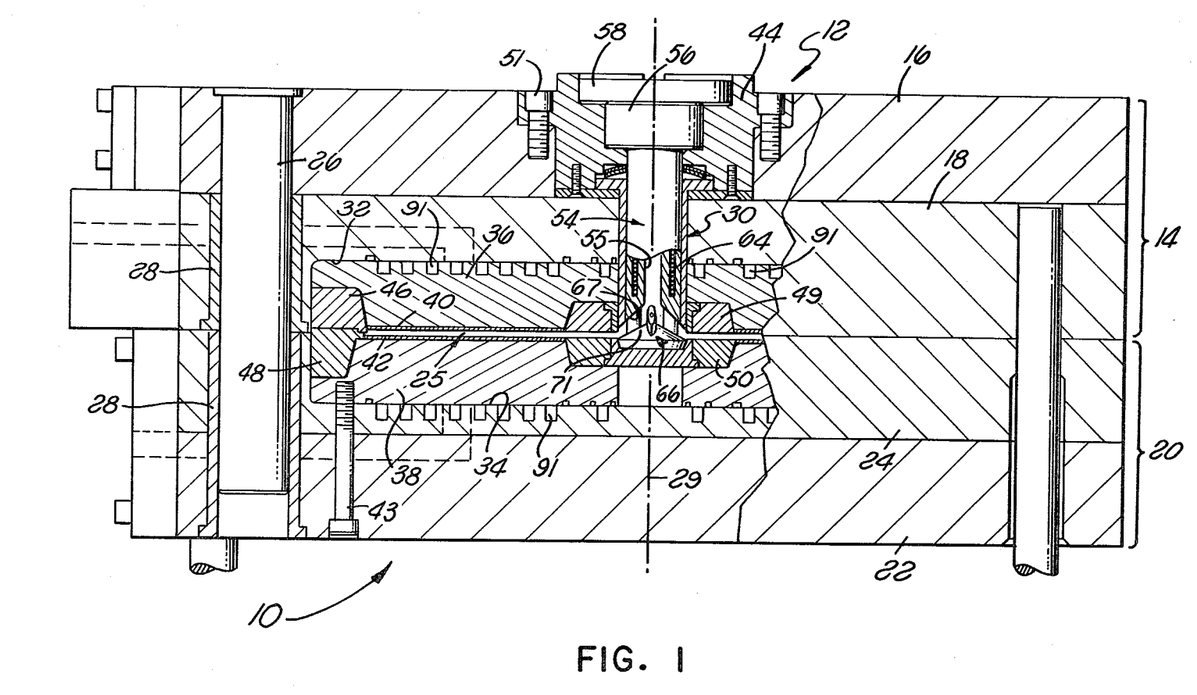
FIG. 1 is a simplified cross-sectional view of an injection molding machine including a hot sprue valve assembly embodying the novel features of this invention, said valve assembly being shown in an open position retracted from a mold cavity.

Referring now to the drawings, and particularly to FIG. 1, there is shown a molding apparatus 10 for use in combination with an injection molding machine (not shown) to provide a centrally apertured record disc, such as a video information disc. One suitable molding machine in which the molding apparatus 10 can be used comprises a 375 ton model manufactured by the Stokes Division of Pennwalt Manufacturing Co.

The molding apparatus 10 comprises a first mold half 14 including a base plate 16 and a carrier plate 18, and a second mold half 20 including a base plate 22 and a carrier plate 24. The first and second mold halves 14 and 20, along with their associated base and carrier plates 16, 18, and 22, 24 are reciprocally movable toward and away from each other to open and close a relatively thin, substantially planar mold cavity 25 in which the information disc is molded. More specifically, the mold halves 14 and 20 are movable between a closed position with their carrier plates 18 and 24 in abutting relation with each other to define the mold cavity 25 as shown in FIG. 1, and an open position with the carrier plates 18 and 24 separated from each other (not shown). A plurality of guide pins 26, one of which is shown in FIG. 1, are secured to the first mold half 14 and received slidably within bushings 28 in the carrier plate 18 and the second mold half 20 to maintain the two mold halves in a desired axial alignment with each other.

The carrier plates 18 and 24 of the two mold halves 14 and 20 respectively include annular plate-shaped recesses 32 and 34 facing toward each other generally in axial alignment for receiving annular platens 36 and 38, respectively. As illustrated, these platens 36 and 38 can be secured in position within the recesses 32 and 34 as by means of bolts 43, one of which is shown secured to the platen 38, all in a well-known manner. The platens 36 and 38 respectively carry annular disc-shaped stamping dies 40 and 42, wherein at least one of the dies has a surface configuration representative of the information to be cast into the molded information disc, and which cooperate with each other when the mold halves 14 and 20 are in the closed position to define the disc-shaped mold cavity 25. Annular clamping rings 46 and 48 can be provided about the circumference of the mold cavity 25 for securing the stamping dies 40 and 42 in fixed positions to their respective platens 36 and 38, all in a well-known manner. Annular center clamps 49 and 50 can also be provided for securing the stamping dies in position. The specific construction and operation of these various components is discussed in further detail in copending and commonly assigned U.S. application Ser. No. 031,205, filed Apr. 18, 1979, by John R. Holmes, and entitled "APPARATUS FOR PRODUCING CENTRALLY APERTURED RECORD DISCS", the disclosure of which is incorporated herein by reference.

A hot sprue valve assembly 12 of this invention is secured to the first mold half 14 for controlled passage of a suitable molten disc-forming material, such as a molten plastic material, under pressure from an injector gun assembly (not shown) into the mold cavity 25. More specifically, an injector gun assembly having a construction generally conventional in the art supplies the disc-forming material in a heated, flowable state in an appropriate quantity and under an appropriate pressure to the hot sprue valve assembly 12. The hot sprue valve assembly 12 guides the molten material through the base plate 16 and the carrier plate 18 of the first mold half 14 for admission or injection into the disc-shaped mold cavity 25. This flow of molten material enters the mold cavity generally along a central axis 29 of the mold cavity under the control of a hollow cylindrical valve sleeve 30, the operation of which will be described herein in more detail.

The hot sprue valve assembly 12 is shown in more detail in FIGS. 2–7. As shown best in FIG. 2, the assembly 12 comprises a generally cylindrical sprue block 44 seated within a matingly-shaped opening 45 in the base plate 16 of the first mold half 14. A radially enlarged flange 47 at the upper end of the sprue block 44 receives a plurality of circumferentially arranged bolts 51 which are fastened into the base plate 16 to secure the sprue block in place. Importantly, the sprue block 44 defines a vertically open passage 52 comprising an inlet port for suitable connection to the injector gun assembly (not shown) and for passage of the molten disc-forming material through the sprue block and toward the mold cavity 25.

Figure 2:
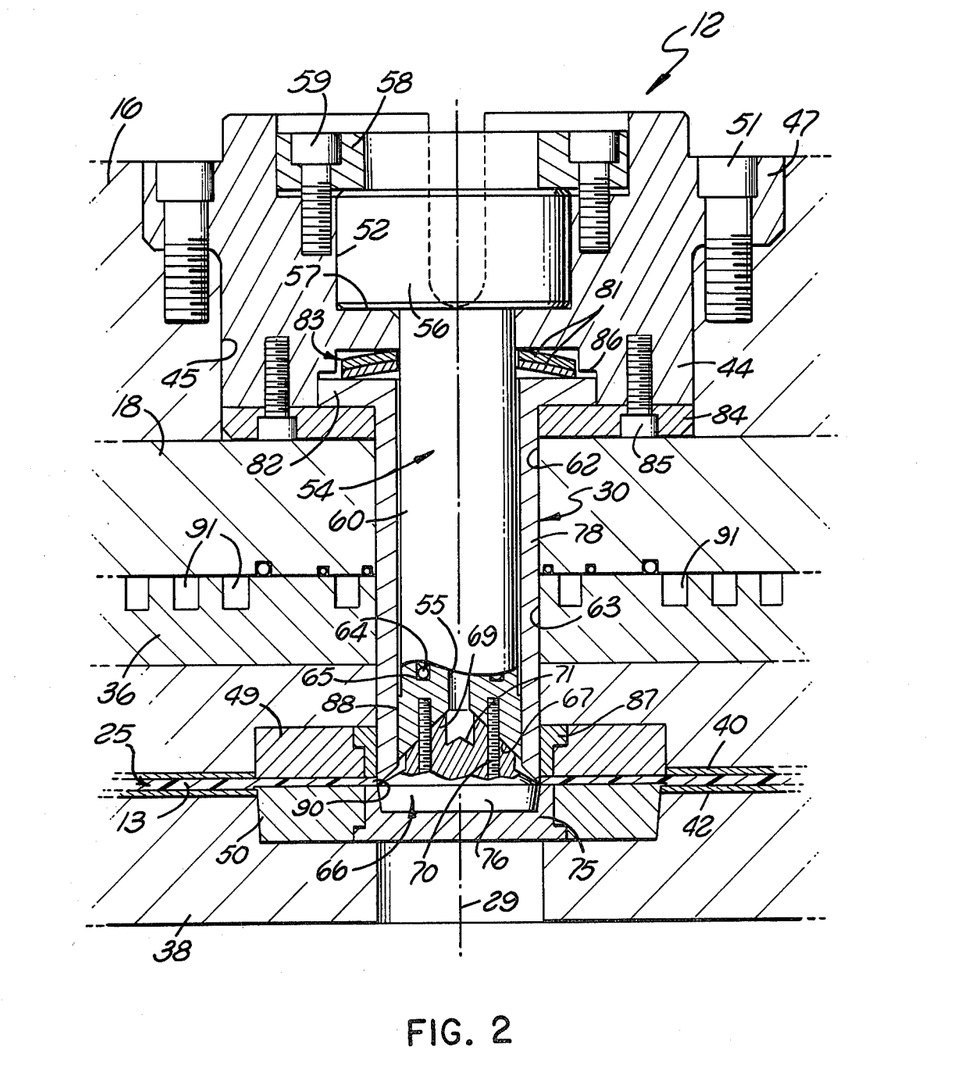
FIG. 2 is an enlarged fragmented cross-sectional view illustrating the hot sprue valve assembly in a closed position advanced into a mold cavity.

A sprue bushing 54 is seated within the sprue block 44 and includes a vertically open bore 55 for guiding the molten material from the passage 52 through the carrier plate 18 toward the mold cavity 25. As illustrated, this sprue bushing is shaped to include an upper radially enlarged collar 56 seated upon an upwardly presented shoulder 57 formed along the length of the passage 52 in the sprue block 44. The sprue bushing collar 56 is trapped in position upon this shoulder 57 by an annular retaining ring 58 which overlies the upper periphery of the collar 56 and is secured to the sprue block 44 by a plurality of bolts 59.

The sprue bushing 54 further includes a tubular shank 60 of reduced cross section projecting downwardly from the collar 56 through a pair of aligned openings 62 and 63 in the carrier plate 18 and the platen 36. This shank 60 positions the sprue bushing bore 55 to extend generally along the central axis 29 of the mold cavity 25 and to terminate adjacent the mold cavity for flow of injected molten disc-forming material thereinto. Conveniently, to prevent undesired solidifying of the molten material within the sprue bushing 54, a heater coil 64 is carried within an axially elongated and annular chamber 65 formed within the shank 60 and about the bore 55. This heater coil 64 can be connected in an appropriate manner to a suitable source (not shown) of electrical power for maintaining the material within the bore 55 in a molten state at all times.

A conically shaped dispersion head 66 is secured to the lower end of the sprue bushing shank 60 and cooperates with the sprue bushing to guide the molten material from the base 55 in a generally radially outward direction into the mold cavity 25 with substantially uniform radial distribution. More specifically, as shown best in FIGS. 3 and 4, the lower end of the sprue bushing shank 60 terminates adjacent the mold cavity 25 in a recessed, conically tapered face 67 such that the lower end of the bore 55 is spaced upwardly from the mold cavity. The dispersion head 66 includes a plurality of upwardly projecting spacer flights 69 arranged equiangularly about the head 66 and including angularly set upper ends matching the conical contour of the tapered sprue bushing face 67. Fastening screws 70 are received upwardly through the dispersion head 66 and the flights 69 and are threaded into the lower end of the sprue bushing shank 60 to secure the head and shank with respect to each other. Accordingly, the dispersion head 66 remains with the sprue bushing 54 upon opening and closing of the mold halves 14 and 20 during production. However, to insure accurate positioning of the dispersion head 66 with respect to the mold cavity each time the mold halves are closed, a seating bushing 75 is mounted on the lower platen 38 and secured in position by the lower clamping ring 50 to matingly receive a lower end 76 of the dispersion head 66. As illustrated in FIG. 2, this lower end 76 of the dispersion head projects downwardly with a converging cross section for positive centering engagement within the seating bushing 75.

The dispersion head 66 is shaped to define an upwardly presented conical face 71 which is maintained by the spacer flights 69 in vertically spaced relation with the tapered conical face 67 on the sprue bushing shank 60. This conical face 71 on the dispersion head 66 is oriented with its apex 72 positioned along the central axis 29 below the bore 55 and to extend therefrom downwardly and radially outwardly into the mold cavity 25. These conical faces 67 and 71 thereby cooperate with each other and with the spacer flights 69 to define an identical plurality of downwardly and radially outwardly extending, extrusion-type flow paths 73 for passage of the molten material into the mold cavity. These flow paths 73 are arranged uniformly about the radius of the dispersion head such that the molten material is divided into uniform smaller flows for substantially uniform radial distribution into the mold cavity. This uniform distribution is enhanced by contouring the spacer flights 69 each to include a generally elliptical cross section with its major axis projecting in a radial direction for smooth flow of the material outwardly from the dispersion head apex 72.

Flow of the molten material into the mold cavity 25 is further governed by forming the conical face 71 on the dispersion head 66 to have an angular taper different from the angular taper of the face 61 on the sprue bushing shank 60. More specifically, the two conical faces 67 and 71 are angularly set with respect to each other to converge vertically toward each other from the bore 55 to the mold cavity. With this construction, the molten material is accelerated as it passes through the flow paths 73 resulting in an increased frictional resistance to material flow and a corresponding elevation in temperature of the material. This temperature elevation helps to prevent premature solidification of the material and assists in a more thorough recombining of the small flow streams into one homogeneous flow downstream of the spacer flights 69 for uniform radial distribution into the mold cavity.

The sleeve valve 30 is carried about the sprue bushing shank 60 for sliding movement between a first position retracted from the mold cavity 25 and a second position projecting into the mold cavity and into seated engagement with the periphery of the dispersion head 66.

More specifically, the sleeve valve 30 comprises a tubular cylinder 78 slidably received within the passages 62 and 63 in the carrier plate 18 and the upper platen 36, and slidably about the sprue bushing shank 60. The lower end of this cylinder 78 is geometrically tailored, as shown best in FIG. 7, to define an annular seat 79 of relatively narrow width and formed at an angle corresponding with the angle of the conical face 71 of the dispersion head 66. Thus, when the sleeve valve 30 is in the advanced position, the annular seat 79 sealingly engages the dispersion head 66 to prevent flow of molten material past the dispersion head into the mold cavity, as viewed in FIGS. 2 and 6. Conversely, when the sleeve valve 30 is in the retracted position, as viewed in FIGS. 1 and 5, the seat 79 is vertically spaced from the dispersion head to permit the molten material to flow into the mold cavity.

The sleeve valve 30 is advantageously designed to open and close automatically in response to the pressure of the molten material within the sprue bushing 54 and the flow paths 73 of the dispersion head 66. That is, the sleeve valve cylinder 78 includes at its lower end a tapered pressure face 80 positioned at the inboard side of the seat 79 and formed at an angle different from the angle of the seat 79. As shown best in FIG. 7, this pressure face 80 extends from the seat 79 angularly upwardly and radially inwardly from the seat in spaced relation with the conical face 71 of the dispersion head 66. With this construction, molten material under pressure between the conical faces 67 and 71 of the sprue bushing shank 60 and the dispersion head 66 also acts upon the pressure face 80 of the sleeve valve to apply a component of force to the valve urging the valve to move upwardly to the retracted position thereby allowing the molten material to flow into the mold cavity 25.

The upwardly directed force acting upon the sleeve valve 30 is resisted by springs 81 acting upon the upper end of the valve cylinder 78 to bias the sleeve valve to remain in the advanced position preventing flow of molten material into the mold cavity. More specifically, as illustrated in FIG. 2, the upper end of the valve cylinder 78 includes a radially enlarged flange 82 positioned within an enlarged chamber 83 at the lower end of the sprue block 44. The springs 81, preferably in the form of a pair of Belleville washer springs, are interposed under compression between the sprue block 44 and the flange 82 to urge the sleeve valve downwardly to the closed position with its seat 79 in engagement with the dispersion head 66. An annular wear plate 84 is secured to the sprue block 44 as by screws 85 to provide a bearing surface for the flange 82 when the valve is in the closed position.

The Belleville springs 81 are chosen to apply a relatively large force to the sleeve valve 30 to urge the valve to remain in the advanced or closed position. Accordingly, when molten disc-forming material is supplied to the sprue bushing 54 by the injector gun assembly (not shown), the pressure initially is insufficient to overcome the spring force and the sleeve valve thus remains in the closed position. This permits the molten material to "prepack" within the sprue bushing into a desirably homogeneous composition with substantially uniform temperature until the sleeve valve is moved to the open or retracted position. This initial "prepack" of the material with the valve 30 closed is illustrated by the region "A" in the graph of FIG. 8.

When the pressure of the molten material reaches a sufficient level to apply a force to the valve pressure face 80 overcoming the force of the springs 81, the sleeve valve 30 responds to the pressure and moves to the retracted or open position. This retracting motion of the sleeve valve is guided by a bushing 87 carried by the upper center clamp 49, and a lower annular land 88 on the lower, outside diameter of the sprue bushing shank 60. When the sleeve valve reaches the retracted position defined by engagement of the upper flange 82 with an annular shoulder 86 on the sprue block (FIG. 2), the pressure face 80 of the cylinder 78 cooperates with the conical faces 67 and 71 of the shank and the dispersion head to guide the molten material smoothly into the mold cavity, as illustrated by the arrows 89 in FIG. 5. As illustrated by way of example in FIG. 8, the retraction of the sleeve valve occurs at say about 2200 psi, and the injector gun assembly thereupon continues to elevate the pressure of the material to a higher level, such as about 5800 psi, as illustrated by region "B", in the graph until the mold cavity is fully filled and packed with the molten material.

Figures 3, 4, 5, 6:
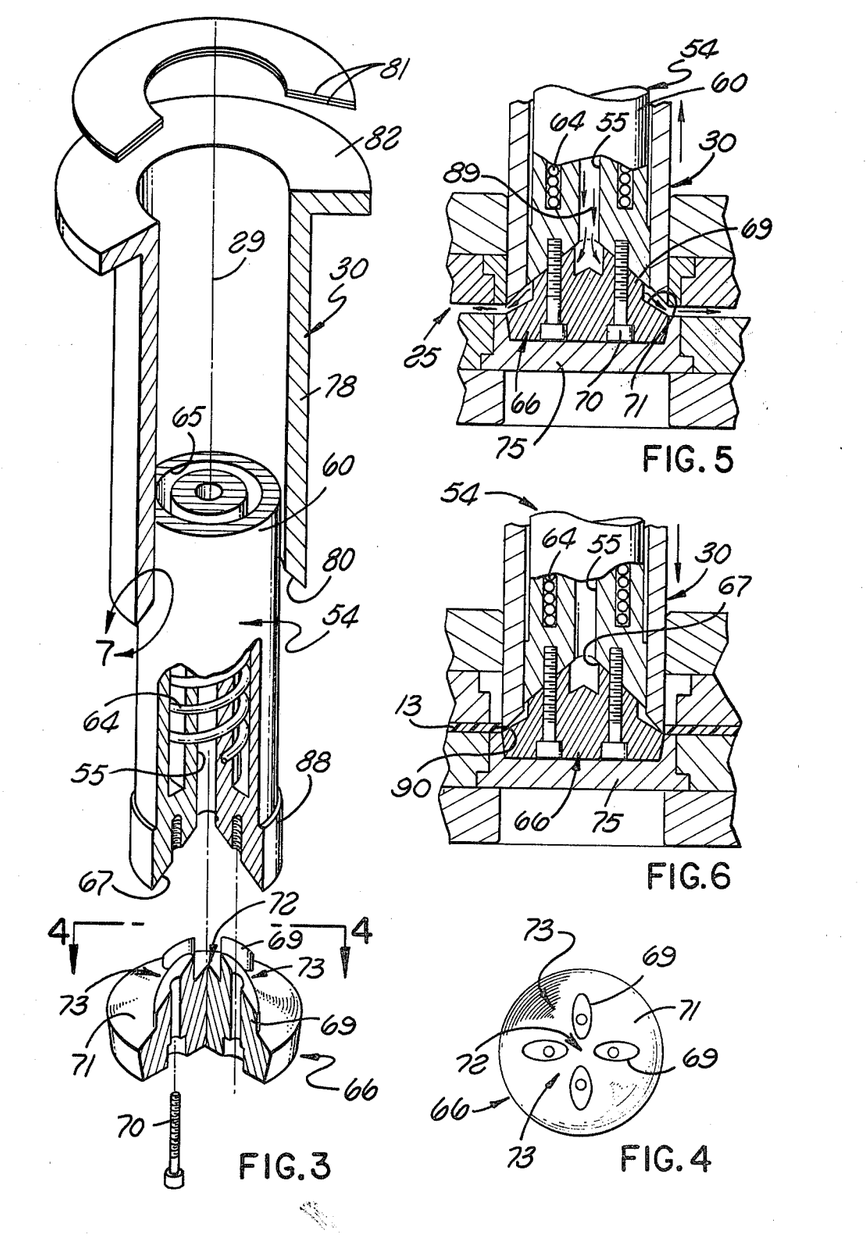
FIG. 3 is an exploded perspective view illustrating the hot sprue valve assembly, with portions broken away.
FIG. 4 is a top plan view of one portion of the valve assembly, taken generally on the line 4—4 of FIG. 3.
FIG. 5 is an enlarged fragmented cross-sectional view illustrating the hot sprue valve assembly in an open position to permit injection of molten material into a mold cavity.
FIG. 6 is an enlarged fragmented cross-sectional view similar to FIG. 5 and illustrating the hot sprue valve assembly in a closed position to prevent passage of molten material into the mold cavity.
Figure 7:
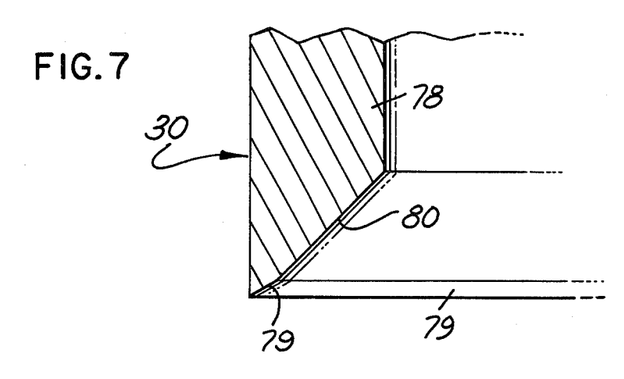
FIG. 7 is an enlarged fragmented cross-sectional view of a portion of a sleeve valve for the hot sprue valve assembly.
Figure 8:
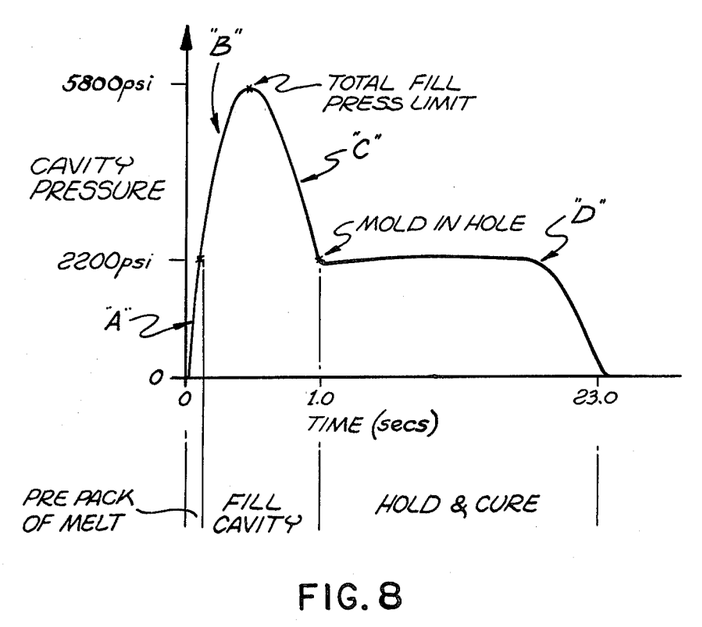
FIG. 8 is a simplified graphical representation illustrating operation of the hot sprue valve assembly of FIGS. 1-7.

After the mold cavity 25 reaches the filled state, the injector gun assembly is appropriately operated in a conventional manner to reduce the pressure applied to the molten material, as illustrated by the region "C" on the graph of FIG. 8. When the pressure falls below the valve retraction pressure, illustrated at 2200 psi, the force applied to the sleeve valve 30 by the springs 81 overcomes the force acting upon the valve pressure face 80 to move the sleeve valve back toward the closed position, as illustrated in FIG. 6. The sleeve valve 30 thus moves across the mold cavity into seated engagement with the dispersion head 66 to separate and isolate the material within the mold cavity from the material within the sprue bushing 54. Importantly, when this occurs, the angular taper of the valve pressure face 80 advantageously helps to force the material in the vicinity of the sleeve valve back toward the sprue bushing bore 55 to thereby prevent localized disruption of the material already within the mold cavity. Moreover, the sleeve valve in the closed position isolates the material within the mold cavity from any pressure pulsations which might be applied by the injector gun assembly to the material within the sprue bushing.

The sleeve valve 30 is sized to have an outer diameter corresponding with the desired inner diameter of a central aperture 90 to be formed in the information disc 13 being molded within the mold cavity. Accordingly, movement of the sleeve valve to the closed position, as shown in FIG. 6, molds the central aperture 90 directly into the disc 13 before solidification of the molten disc-forming material to eliminate any requirement for subsequent formation and/or punching of the aperture. In addition, the aperture is molded without requiring any complex valve actuation apparatus, particularly on the side of the mold cavity opposite the sprue bushing, thereby resulting in simplification of the second mold half 20.

After movement of the sleeve valve 30 to the closed position, the molten material within the mold cavity is permitted to solidify to form the molded information disc 13, as illustrated by the region "D" in the graph of FIG. 8. Solidification time is conveniently controlled to a relatively short time period by circulating a suitable liquid coolant through flow passages 91 (FIG. 1) in close proximity with the mold cavity. During this solidification, however, the material within the sprue bushing and in the vicinity of the dispersion head inside the sleeve valve is maintained in a molten state by virtue of heat input from the heater coil 64. This heat input is conducted in sufficient quantity by the spacer flights 69 to the upper portion of the dispersion head 66 to prevent solidification of the material at the inside of the sleeve valve while permitting solidification within the mold cavity.

After solidification, the mold cavity is opened by movement of the two mold halves 14 and 20 away from each other to expose the molded disc 13 for removal from the machine. This removal of the disc can be accomplished manually, or by use of a variety of automated ejector apparatus and devices well known to those skilled in the art. After removal, the mold halves can be moved back toward each other to close the mold cavity 25 for initiation of a subsequent molding cycle.

Figure 9:
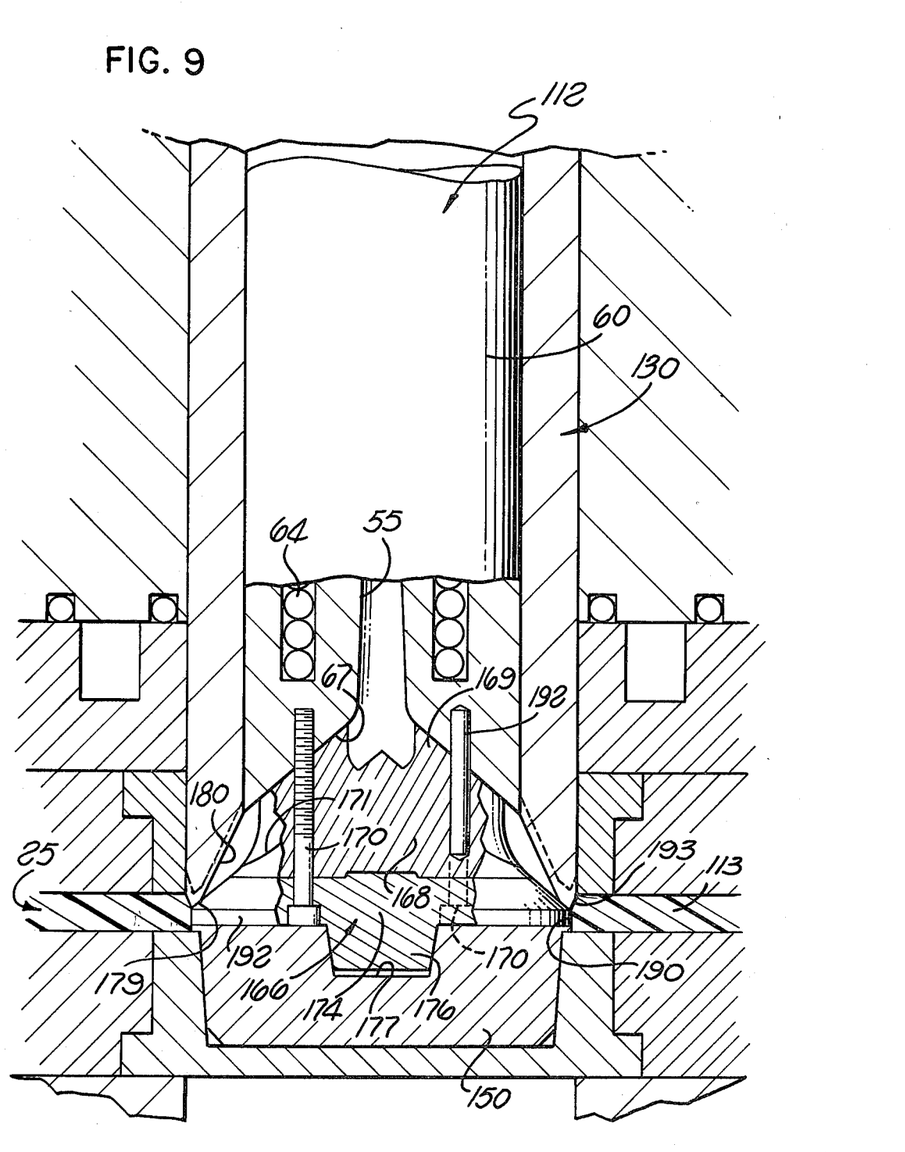
FIG. 9 is an enlarged fragmented cross-sectional view illustrating an alternative embodiment of the hot sprue valve assembly of this invention.

An alternative embodiment of the invention is illustrated in FIG. 9, wherein components identical to those shown and described with respect to FIGS. 1-7 are designated by common reference numerals. As illustrated, a modified hot sprue valve assembly 112 is provided for controlling injection of molten disc-forming material into a disc-shaped mold cavity 25. According to the embodiment of FIG. 9, the hot sprue valve assembly 112 includes a modified form of a dispersion head 166 and sleeve valve 130.

The modified hot sprue valve assembly 112 includes a sprue bushing shank 60 which carries a heater coil 64 for maintaining disc-forming material in a molten state as it passes through a vertically open bore 55. The lower end of the shank 60 is shaped to define the recessed conical face 67 shaped for mating abutment with the upper ends of spacer flights 169 of the modified dispersion head 166. These spacer flights project upwardly from a conical dispersion head face 171 which is maintained by the flights in vertically spaced relation with the face 67 on the sprue bushing shank 60. As in the previous embodiment, these conical faces 67 and 171 cooperate to define the multiple flow paths extending from the bore 55 downwardly and radially outwardly about the flights 169 and toward the mold cavity 25.

In the embodiment of FIG. 9, the dispersion head 166 is defined by an upper half 168 and a lower half 174 which together define the conical face 171. Importantly, the lower half 174 is formed from a material such as a hardened steel well adapted for bearing and sealing engagement by contact with an annular seat 179 at the lower end of the sleeve valve 130. This lower half 174 further includes a downwardly projecting centering stud 176 of decreasing cross section which in the embodiment illustrated, is shaped for mating reception within a complementary-shaped recess 177 formed within a modified seating bushing assembly 150. The upper half 168 of the dispersion head 166 is formed from a good heat conductive material such as beryllium copper for efficient and effective transfer of heat energy from the heater coil 64 to the dispersion head 166. With this construction, disc-forming material in the vicinity of the dispersion head is maintained in a molten state when the sleeve valve 130 is closed to isolate this material from the mold cavity and to prevent solidification of this material prior to injection into the mold cavity.

The dispersion head upper and lower halves 168 and 174 are conveniently secured together and to the sprue bushing shank 60 by a plurality of fastening screws 170 extending upwardly through the halves and through the flights 169 for threaded reception into the shank. Alternately a separate screw (not shown) may be used to connect the halves 168 and 174 together, with the plurality of fastening screws being provided for securing the upper half 168 to the shank. Still further, as illustrated in FIG. 9, one or more of the fastening screws 170 may be replaced by a so-called thermal pin in the form of a heat conductive hollow pin 192 filled with a rarified heat-conductive gas, such as a thermal pin of the type manufactured and sold by the Kona Corporation of Gloucester, Massachusetts. This type of gas-filled thermal pin provides a highly conductive heat transfer link between the heated sprue bushing shank 60 and the dispersion head 166.

The sleeve valve 130 including the annular seat 179 further includes an annular pressure face 180 extending from the seat 179 upwardly and radially inwardly toward the outer periphery of the conical face 67 on the shank. As shown, this pressure face provides an extended angular surface for pressure reaction in response to the pressure of the molten material, as described previously with respect to the embodiment of FIGS. 1–7. Alternately, if desired, the sleeve valve can be actuated by appropriate hydraulic or pneumatic means or the like between the advanced and retracted positions. In either event, when the valve is in the retracted position as illustrated by the dotted lines in FIG. 9, the angular contour of the pressure face 180 is selected to cooperate with the shank conical face 67 for smooth flow of the molten material into the mold cavity 25 and to cooperate with the dispersion head conical face 171 to define the multiple flow paths with decreasing vertical cross section as the material flows into the mold cavity.

In use of the embodiment of FIG. 9, the molten material is injected into the mold cavity 25 in the same manner as described with respect to FIGS. 1–7 to form an information disc 113. When the cavity is appropriately filled and packed with the molten material, the sleeve valve 130 moves to the advanced or closed position projecting into the mold cavity into sealing engagement with the lower half 174 of the dispersion head 166 and to mold the required central aperture 190 in the disc. However, in this embodiment, at least a portion of the central aperture 190 is defined by a cylindrical periphery 192 of the dispersion head 166 within the mold cavity. The remaining portion of the central aperture is defined by an annular bevel 193 on the lower, radially outer edge of the sleeve valve 130 which molds a complementary-shaped bevel into the disc 113. This bevel-shaped configuration molded into the disc facilitates placement of the disc onto the spindle of suitable playback apparatus (not shown) for reproducing the information recorded on the disc.

Figure 10:
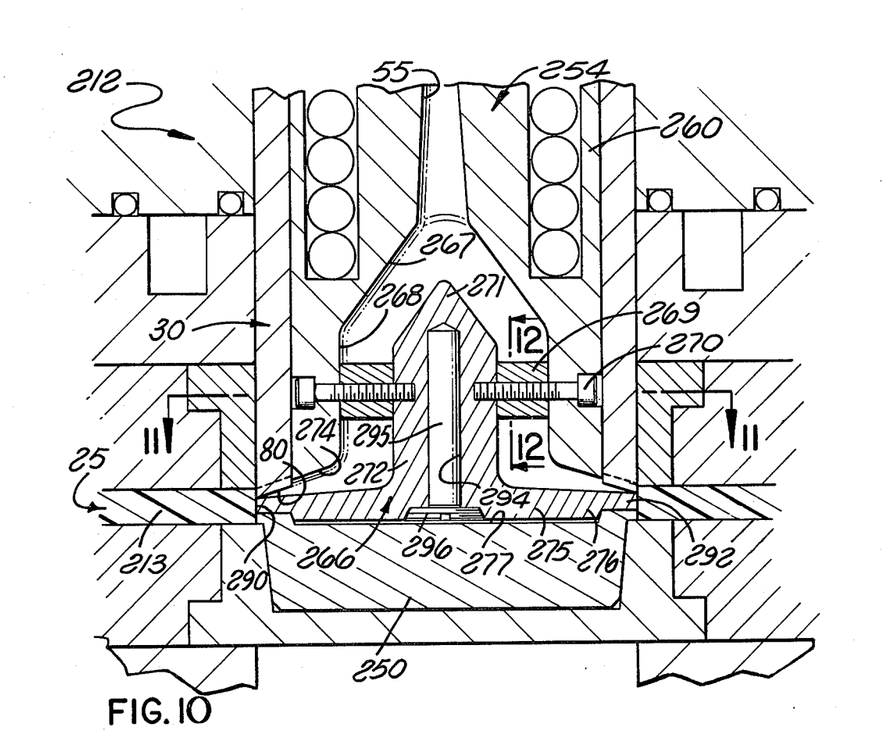
FIG. 10 is an enlarged fragmented cross-sectional view illustrating an additional alternative embodiment of the hot sprue valve assembly of this invention.
Figures 11, 12:
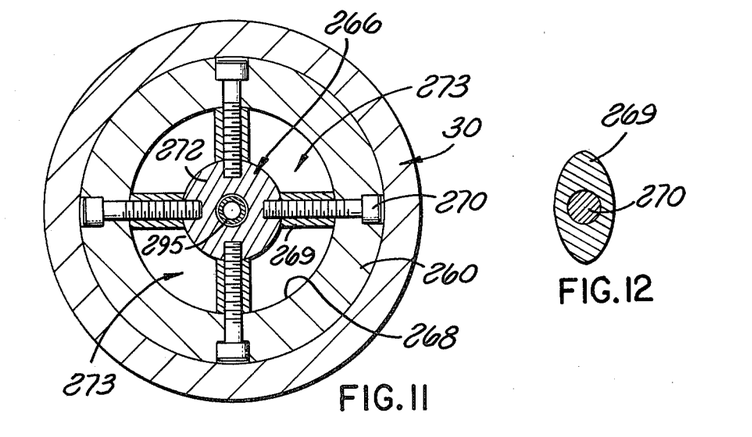
FIG. 11 is a horizontal section taken generally on the line 11—11 of FIG. 10.
FIG. 12 is an enlarged vertical section taken generally on the line 12—12 of FIG. 10.

A further embodiment of the invention is illustrated in FIGS. 10–12 wherein, once again, components identical to the embodiment of FIGS. 1–7 are designated by common reference numerals. As illustrated, this embodiment incorporates a modified sprue bushing 254 in association with a modified dispersion head and spacer flight arrangement shown for guiding molten disc-forming material into a mold cavity 25.

In the embodiment of FIGS. 10–12, a modified hot sprue valve assembly 212 includes the tubular sprue bushing 254 having a lower shank 260 carrying a heater coil 64 to maintain plastic disc-forming material in a molten state during passage through a vertical bore 55. The lower end of this shank 260 includes a recessed conical face 267 projecting from the bore 55 downwardly and radially outwardly, and this face 267 merges into a downwardly extending cylindrical surface 268. The lowermost extent of this cylindrical surface 268 in turn blends with an additional downwardly and radially outwardly extending annular surface 274 which cooperates with a pressure face 80 on the sleeve valve 30 to guide the molten material into the mold cavity 25 to form an information disc 213.

The modified dispersion head 266 is secured to the lower end of the shank 260. As illustrated, this modified dispersion head 266 includes a relatively small conical portion 271 at the upper end of a cylindrical stud 272 which in turn is joined at its lower end to a generally disc-shaped base 275.

The base 275 is shaped to define a cylindrical periphery 292 positioned within the mold cavity 25 to mold a portion of a central aperture 290 into the molded information disc 213, and further to include a downwardly projecting centering boss 276 of decreasing cross section for mating reception within a complementary-shaped recess 277 in a modified seating bushing assembly. A plurality of spacer flights 269 are interposed between the stud 272 of the dispersion head 266 and the cylindrical surface 268 of the shank 260, with fastening screws 270 extending horizontally through the shank and the flights 269 for threaded reception into the stud. These flights 269 are equiangularly arranged about the stud to define a plurality of vertically open flow paths 273 for separation and substantially uniform radial distribution of the molten material. The flow paths 273 extend from the sprue bushing bore 55 downwardly for radial distribution by the conical portion 271 of the dispersion head 266. The distributed material is separated smoothly into separate flow streams by the generally elliptical and vertically elongated cross-sectional shapes of the spacer flights 269, as viewed in FIG. 12, whereupon the molten material is recombined and rehomogenized into a single flow stream prior to accelerated delivery to the mold cavity between the converging surfaces provided by the lower angled surface 274 and the sleeve valve pressure face 80 with respect to the dispersion head base 275.

The dispersion head 266 advantageously includes a central chamber 294 in which is received a thermal pin 295 such as a hollow copper pin filled with a highly heat-conductive rarified gas. This thermal pin, as viewed in FIG. 10, may be removably positioned within the chamber 294 by means of a set screw 296 closing the lower end of the chamber. During operation, the thermal pin 295 assists in the transfer of heat energy to the dispersion head 266 and the retention of this heat energy to result in a higher head temperature during normal operation. The elevation in head temperature more effectively maintains the disc-forming material between the head 266 and the sprue bushing shank 260 in a molten state to prevent solidification of the material prior to injection into the mold cavity.

In operation of the embodiment of FIGS. 10–12, the molten disc-forming material is injected through the hot sprue valve assembly 212 into the mold cavity in generally the same manner as described with respect to the embodiment of FIGS. 1–7. The molten material under pressure forces the sleeve valve 30 to move to the retracted position, as illustrated by the dotted lines in FIG. 10, for flow into the cavity. When the cavity is filled and packed with the molten material, the pressure thereon is relieved to permit the sleeve valve 30 to move to the advanced position in seated engagement upon the outer periphery of the dispersion head base 275. This valve movement completes molding of the central aperture 290 in the disc 213 and isolates the material within the mold cavity 25 from the material within the hot sprue valve assembly 212. Accordingly, the material within the mold cavity can be cooled and solidified to the exclusion of the material within the valve assembly which is maintained in a molten state by the heat generated by the heater coil 64 and effectively transferred to and retained by the dispersion head 266 by means of the thermal pin 295.

Figures 13, 14, 15:
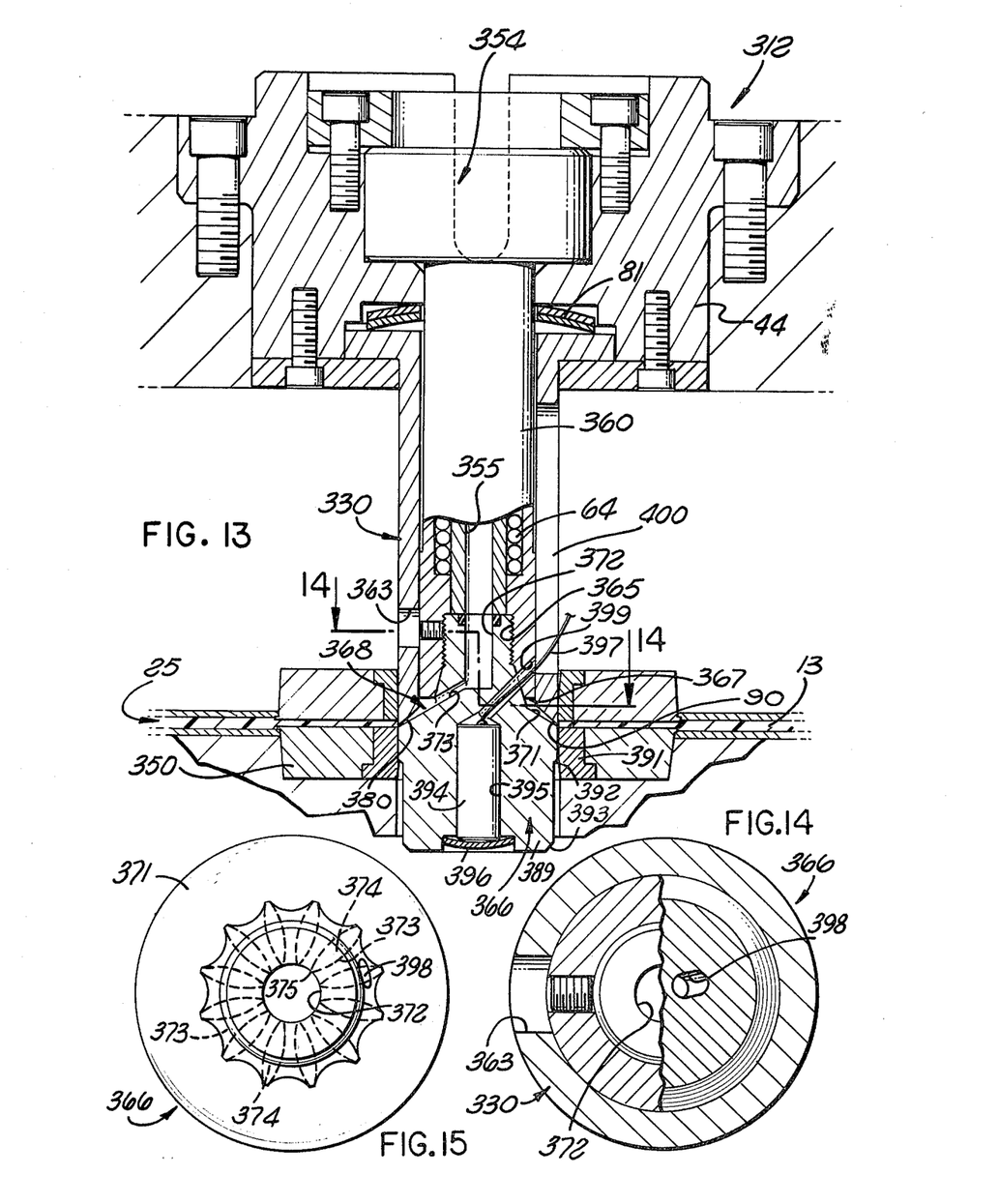
FIG. 13 is an enlarged fragmented cross-sectional view illustrating another alternative embodiment of the hot sprue valve assembly of this invention.
FIG. 14 is a horizontal section taken generally on the line 14—14 of FIG. 13.
FIG. 15 is a top plan view of a portion of the hot sprue valve assembly shown in FIGS. 13 and 14.

Still another embodiment of the invention is shown in FIGS. 13–15 wherein components identical to the embodiment of FIGS. 1–7 are again designated by common reference numerals. In this embodiment, a further modified hot sprue valve assembly 312 includes a modified sprue bushing 354 carried at its upper end with a sprue block 44. This sprue bushing includes a shank 360 carrying a heater coil 64 about a vertically open bore 355 for passage of molten disc-forming material downwardly toward the mold cavity 25 through a modified dispersion head 366.

The lower end of the sprue bushing bore 55 opens into an enlarged threaded recess 365 for receiving the upper threaded end of the dispersion head 366. A set screw may be inserted through an opening 363 in the sleeve valve 330 and secured into a threaded passage 362 in the shank 360 to lock the dispersion head in place. This dispersion head 366 is thus secured into the lower end of the shank 360 to position a relatively short tubular passage 372 in alignment with the shank bore 355. This short tubular passage 372 opens at its lower end into a radially arranged plurality of contoured flow paths 373 separated from each other by a plurality of upstanding risers 374. The upstream edges of these risers 374 define relatively sharp, vane-like surfaces 375 for dividing the material flow with generally uniform radial distribution into and through the flow paths 373. These flow paths, as shown in FIG. 13, extend downwardly and radially outwardly for flow of the material toward the mold cavity.

The flow paths 373 open at their downstream ends into an annular chamber 368 defined by a generally upwardly presented conical face 371 on the dispersion head, the lower end 367 of the shank 360, and the contoured pressure face 380 of a modified sleeve valve 330. The molten material remixes and rehomogenizes within this chamber 368 prior to passage thereof radially outwardly with substantially uniform distribution into the mold cavity. Such passage is, of course, governed by the pressure of the material within the chamber 368 acting against the pressure face 380 of the sleeve valve to urge the sleeve valve upwardly against the effects of the Belleville springs 81, in the same manner as described with respect to the embodiment of FIGS. 1-7. Alternately, the pressure-responsive operation of the sleeve valve can be replaced by use of conventional pneumatic or hydraulic controls, or the like.

The lower end of the dispersion head 366 is provided in the form of an enlarged cylindrical body 389 sized and shaped to fit tightly within a bushing 391 carried by a modified lower center clamp 350. If desired, this body 389 includes beveled lower edges 392 and 393 to assist in accurate centering alignment of the dispersion head within the bushing 391 whenever the mold halves are closed. Importantly, a heater cartridge 394 preferably of the electrical resistance type is received within a central chamber 395 in the body and supported in position by a lower, removable plug 396. Electrical power is supplied to this heater cartridge 394 via conductors 397 which extend from the cartridge away from the hot sprue valve assembly 312 through aligned ports 398 and 399 in the dispersion head and the lower end of the sprue bushing shank 360, and further through a slot 400 in the sleeve valve 330.

In operation of the embodiment of FIGS. 13-15, the molten disc-forming material is injected into the mold cavity 25 through the hot sprue valve assembly 312 in generally the same manner as described with respect to the embodiment of FIGS. 1-7. The pressure upon the material moves the sleeve valve 330 to the retracted or open position allowing the material to flow into and pack the mold cavity to form the information disc 13. When injection pressure is relieved, the valve 330 returns to the advanced or closed position extending into the mold cavity into seated engagement with the outer periphery of the conical face 371 on the dispersion head 366. Thus, the sleeve valve functions to mold a central aperture 90 into the disc 13 and to isolate the disc-forming material within the mold cavity from the material within the valve assembly 312. The heater cartridge 394 advantageously maintains the material within the valve assembly in a molten state at all times independent of the material within the mold cavity which is cooled and solidified to define the molded information disc.

The present invention thus provides an improved hot sprue valve assembly for controlling flow of disc-forming material into the mold cavity of an injection molding machine, particularly of the type for molding video information discs. The hot sprue valve assembly includes a sleeve valve carried about a hot sprue bushing and movable for simultaneously controlling molten material flow into the mold cavity and for molding a central aperture directly into the disc prior to disc solidification. A dispersion head carried by the hot sprue bushing is positioned between the sleeve valve and the sprue bushing for generally uniform radial distribution of molten material into the mold cavity when the valve is opened and for maintaining the temperature level of molten material independent of the material within the mold cavity when the valve is closed.

A wide variety of further modifications and improvements to the invention described herein are believed to be now apparent to one skilled in the art. Accordingly, no limitation upon the invention is intended, except by way of the appended claims.

What is claimed is:

1. In an injection molding machine for producing centrally apertured record discs, a valve assembly for controlling flow of molten disc-forming material through a sprue bushing into a disc-shaped mold cavity, comprising:

a sleeve valve carried about the sprue bushing for axially sliding movement between a first position retracted from the mold cavity to allow flow of the molten disc-forming material through the sprue bushing into the mold cavity, and a second position advanced into the mold cavity to separate the sprue bushing from the mold cavity for preventing flow of the molten disc-forming material through the sprue bushing into the mold cavity and for molding a central aperture in the record disc; and means for controlling movement of said sleeve valve between said first and second positions, said control means moving said sleeve valve to said second position prior to solidification of said disc-forming material within the mold cavity, said control means comprising a spring for biasing said sleeve valve toward said second position, said sleeve valve including an angularly set pressure face at its end adjacent the mold cavity and oriented for communication with disc-forming material within the sprue bushing, said sleeve valve being responsive to the pressure of the material within the sprue bushing acting upon said pressure face for movement against said spring to said first position when the pressure reaches a predetermined magnitude.

2. The valve assembly of claim 1 wherein the sprue bushing includes a generally tubular shank having a central bore formed therein and oriented generally along a central axis of the mold cavity for passage of the molten disc-forming material toward the mold cavity, said sleeve valve comprising a generally hollow cylinder positioned concentrically about the shank for sliding movement with respect to the shank generally along said central axis.

3. The valve assembly of claim 2 wherein said sleeve valve cylinder has an outer diameter generally corresponding with the desired diameter of the central aperture to be formed in the record disc.

4. The valve assembly of claim 1 wherein the end of said sleeve valve opposite the mold cavity includes a radially enlarged flange, said spring comprising a compression spring reacting between said flange and the machine to urge said sleeve valve toward said second position.

5. The valve assembly of claim 4 wherein said compression spring comprises a Belleville washer spring.

6. The valve assembly of claim 1 including a dispersion head secured to the end of the sprue bushing adjacent the mold cavity, said head including means for guiding the molten disc-forming material within the sprue bushing in a generally radially outward direction with substantially uniform radial distribution into the mold cavity.

7. The valve assembly of claim 6 including means for centering said dispersion head about a central axis of the mold cavity.

8. The valve assembly of claim 6 including means for maintaining the temperature of said dispersion head at a relatively high level for maintaining the material between the sprue bushing and said head in a molten state.

9. The valve assembly of claim 6 wherein said dispersion head including a valve seat surface for engagement by said sleeve valve when said sleeve valve is in said second position.

10. The valve assembly of claim 9 wherein said valve seat surface comprises an outer periphery portion of a conical face on said dispersion head for directing material from the sprue bushing in an axial and radially outwardly angled direction into the mold cavity, said sleeve valve including an annular valve seat formed at its end adjacent the mold cavity for seating engagement upon said seat surface.

11. The valve assembly of claim 10 wherein said sleeve valve further includes an annular pressure face extending from said valve seat axially and radially inwardly toward the sprue bushing in spaced relation with said dispersion head when said sleeve valve is in said second position, said pressure face being configured for smoothly guiding material form the sprue bushing toward the mold cavity when said sleeve valve is in said first position.

12. The valve assembly of claim 10 wherein said dispersion head further includes a cylindrical portion positioned within the mold cavity to mold a portion of the central aperture in the record disc, and wherein said sleeve valve further includes a beveled outer peripheral edge at its end adjacent the mold cavity for molding a complementary-shaped bevel into the record disc.

13. In an injection molding machine for producing centrally apertured record discs, a valve assembly for controlling flow of molten disc-forming material through a sprue bushing into a disc-shaped mold cavity, comprising:

a dispersion head secured to the end of the sprue bushing adjacent the mold cavity and including means for guiding the molten disc-forming material from the sprue bushing is a generally radially outward direction with substantially uniform radial distribution into the mold cavity;

a sleeve valve carried about the sprue bushing for sliding movement between a first position retracted from the mold cavity to allow the material to flow from the sprue bushing past said dispersion head into the mold cavity, and a second position advanced into the mold cavity in seated engagement upon a portion of said dispersion head for separating material within said valve from material within the mold cavity to prevent flow of the material into the mold cavity, said sleeve valve and said dispersion head cooperating to mold a central aperture in the record disc; and means for controlling movement of said sleeve valve between said first and second positions, said control means moving said sleeve valve to said second position prior to solidification of said disc-forming material within the mold cavity, said control means comprising a spring for biasing said sleeve valve toward said second position, said sleeve valve further including an annular pressure face extending from said valve seat in a radially inward direction axially away from the mold cavity in spaced relation with said dispersion head when said sleeve valve is in said second position, said pressure face being responsive to the pressure of material within the sprue bushing for movement of said sleeve valve to said first position when the pressure exceeds a predetermined magnitude.

14. The valve assembly of claim 13 wherein said dispersion head includes a first portion formed from a relatively hard material for seating engagement by said sleeve valve, and a second portion in bearing engagement with the sprue bushing and formed from a relatively high heat conductive material.

15. The valve assembly of claim 13 wherein said sleeve valve includes an annular valve seat for seated engagement upon an outer peripheral portion of said dispersion head.

16. The valve assembly of claim 15 wherein said dispersion head includes a cylindrical portion positioned within the mold cavity to mold a portion of the central aperture in the record disc, and wherein said sleeve valve further includes a beveled outer peripheral edge at its end adjacent the mold cavity for molding a complementary-shaped bevel into the record disc.

17. The valve assembly of claim 13 wherein said pressure face cooperates with the sprue bushing when said sleeve valve is in said first position for smoothly guiding material from the sprue bushing toward the mold cavity.

18. The valve assembly of claim 17 wherein said pressure face cooperates with the sprue bushing and with said dispersion head to define an annular passage of progressively narrowing axial dimension for flow of the material from the sprue bushing into the mold cavity when said sleeve valve is in said first position.

19. The valve assembly of claim 13 wherein the sprue bushing includes a central bore extending generally along a central axis of the mold cavity, and a recessed conical face at its end adjacent the mold cavity; said dispersion head including a conical face presented toward said end of the sprue bushing, a plurality of spacer flights maintaining said dispersion head conical face in spaced relation with the sprue bushing, and means for securing said dispersion head to the sprue bushing.

20. The valve assembly of claim 19 including at least one thermal pin extending from the sprue bushing through one of said spacer flights into said dispersion head for conducting heat from the sprue bushing to said head.

21. The valve assembly of claim 20 wherein said thermal pin comprises cavity-forming means for receiving a highly heat conductive rarified gas.

22. The valve assembly of claim 19 including at least one thermal pin received within said dispersion head.

23. The valve assembly of claim 19 wherein said spacer flights are generally equiangularly arranged about said central axis and are contoured for relatively smooth separation of material from the sprue bushing into a plurality of radially distributed, substantially uniform smaller flow streams, said flow streams being reunited into a unitary homogeneous material flow downsteam of said spacer flights.

24. The valve assembly of claim 13 wherein said dispersion head has a plurality of passages formed therein for flow of the material in a plurality of flow streams from the sprue bushing generally radially outwardly toward the mold cavity, said head cooperating with said sleeve valve to define an annular chamber for reuniting the flow streams into a unitary homogeneous material flow prior to entry into the mold cavity.

25. The valve assembly of claim 24 including heater means within said dispersion head for maintaining the temperature of the material within said passages and said chamber sufficiently to maintain the material in a molten state.

26. A mold assembly for an injection molding machine, comprising:
 first and second mold halves movable toward each other to define a disc-shaped mold cavity, and movable away from each other to allow a molded disc to be removed from said mold cavity;
 a sprue bushing mounted on said first mold half and including a central bore for passage of molten material in a direction toward the mold cavity generally along a central axis of the mold cavity;
 a dispersion head secured to the end of the sprue bushing adjacent the mold cavity and including means for guiding the molten disc-forming material from the sprue bushing in a generally radially outward direction with substantially uniform radial distribution into the mold cavity;
 a sleeve valve carried about the sprue bushing for sliding movement between a first position retracted from the mold cavity to allow the material to flow from the sprue bushing past said dispersion head into the mold cavity, and a second position advanced into the mold cavity in seated engagement upon a portion of said dispersion head for separating material within said valve from material within the mold cavity to prevent flow of the material into the mold cavity, said sleeve valve and said dispersion head cooperating to mold a central aperture in the record disc; and
 means for controlling movement of said sleeve valve between said first and second positions,
 said control means moving said valve to said second position prior to solidification of said disc-forming material within the mold cavity,
 said control means comprising a spring for urging said sleeve valve toward said second position,
 said sleeve valve including an angularly set pressure face at its end adjacent the mold cavity and oriented for communication with disc-forming material within the sprue bushing, said sleeve valve being responsive to the pressure of the material within the sprue bushing acting upon said pressure face for movement against said spring to said first position when the pressure reaches a predetermined magnitude.

27. The mold assembly of claim 26 wherein said dispersion head further includes a cylindrical portion positioned within the mold cavity to mold a portion of the central aperture in the record disc, and wherein said sleeve valve further includes a beveled outer peripheral edge at its end adjacent the mold cavity for molding a complementary-shaped bevel into the record disc.

28. The mold assembly of claim 26 including means for centering said dispersion head about a central axis of the mold cavity.

29. The mold assembly of claim 26 including means for elevating the temperature of said disperion head for maintaining the material in the vicinity of said head in a molten state.

30. The mold assembly of claim 26 wherein said dispersion head includes a first portion formed from a relatively hard material for seating engagement by said sleeve valve, and a second portion in bearing engagement with the sprue bushing formed from a relatively high heat conductive material.

31. The mold assembly of claim 26 wherein said sleeve valve isolates the material within the mold cavity from material within said sprue bushing when said valve is in said second position, and thereby isolates the material within the mold cavity from pressure acting upon the material within said sprue bushing.

* * * * *